United States Patent [19]
Bellia et al.

[11] Patent Number: 5,486,086
[45] Date of Patent: Jan. 23, 1996

[54] BLADE CONTAINMENT SYSTEM

[75] Inventors: Donald L. Bellia, West Chester; Christopher C. Glynn, Hamilton; Brian J. Humke, Cincinnati, all of Ohio

[73] Assignee: General Electric Company, Cincinnati, Ohio

[21] Appl. No.: 177,297

[22] Filed: Jan. 4, 1994

[51] Int. Cl.⁶ .................................................. F01D 25/24
[52] U.S. Cl. ................................................................. 415/9
[58] Field of Search ...................................................... 415/9

[56] References Cited

U.S. PATENT DOCUMENTS

| | | | |
|---|---|---|---|
| 4,149,824 | 4/1979 | Adamson | 415/9 |
| 4,534,698 | 8/1985 | Tomich | 415/9 |
| 4,648,795 | 3/1987 | Lardellier | 415/9 |
| 5,050,385 | 9/1991 | Hirose et al. | |
| 5,188,505 | 2/1993 | Schilling et al. | 415/9 |
| 5,336,044 | 4/1994 | Forrester | 415/9 |
| 5,403,148 | 4/1995 | Forrester | 415/9 |

*Primary Examiner*—John T. Kwon
*Attorney, Agent, or Firm*—Andrew C. Hess; Patrick R. Scanlon

[57] ABSTRACT

A blade containment system is disclosed which includes an annular casing positioned radially outward of the blades and in surrounding relationship therewith, the annular casing including a plurality of ribs on the outer radial surface thereof, wherein the ribs limit the propagation of cracks and holes formed in the annular casing.

16 Claims, 4 Drawing Sheets

BLADE CONTAINMENT SYSTEM

BACKGROUND OF THE INVENTION

1. Field of the Invention

The present invention relates to a blade containment system for a gas turbine engine, and, more particularly, to a blade containment system including an annular casing having a plurality of ribs formed thereon in order to limit the propagation of cracks and holes formed in the annular casing.

2. Description of Related Art

Conventional high bypass ratio turbofan engines, which are included in the more general category of gas turbine engines and which may be used for aircraft propulsion, typically include a fan, booster, high pressure compressor, combustor, high pressure turbine, and low pressure turbine in serial axial flow relationship about a longitudinal centerline axis of the engine. The high pressure turbine is drivingly connected to the high pressure compressor via a first rotor shaft, and the low pressure turbine is drivingly connected to both the fan and booster via a second rotor shaft, The fan includes an annular disk and a plurality of radially extending blades mounted on the disk, wherein the disk and the blades are rotatable about the longitudinal centerline of the engine. The engine further includes an annular fan casing which surrounds the blades in radially spaced relationship.

Gas turbine engines typically operate at relatively high rotational speeds and, for high bypass ratio turbofans, the fan blades typically include a relatively large radially extending length. Consequently, the fan blades possess relatively high kinetic energy even when the blades are fabricated using lightweight alloys or composite materials. Containment of fan blades has been a continuing problem for the industry, as various known events may occur during engine operation, such as blade contact with foreign or domestic objects, which may cause a blade to be released from the fan disk.

In order to prevent such fan blades or fragments thereof from penetrating the annular fan casing, various containment systems have been employed. While such containment systems have included the use of an annular fan casing manufactured from a high strength material with an adequate radially extending shell thickness to absorb the kinetic energy of the impacting fan blade, more recent containment systems have employed various nesting areas defined by inner and outer annular casings which may include honeycomb structures therein. In addition, ballistic material may be wrapped around the fan casing between the honeycomb structure and the outer casing. An example of such a blade containment structure is found in U.S. Pat. No. 4,534,698 to Tomich.

It has been found that once a hole or crack has been formed in the inner casing of such prior art fan containment casings that such cracks propagate throughout the inner casing. Because the inner casing is the primary load carrying structure of the fan containment case, the size of such a crack or hole caused during a fan blade-out event must be minimized. By doing so, the overturning moment imparted on the engine structure is minimized since the fan case acts as a "journal bearing" for the fan during spool-down of the engine after a blade-out event, whereby the rubbing action of the fan on the case reduces the orbiting of the fan rotor and therefore the overturning moment on the engine structure. Moreover, a large hole or crack in the inner casing reduces its ovalization stiffness, and may allow the fan to orbit into the hole if the hole becomes too large. Additionally, an unarrested crack may propagate to a point where the fan cowl and containment case become detached from the engine, which is unacceptable.

SUMMARY OF THE INVENTION

In accordance with one aspect of the present invention, a blade containment system is disclosed which includes an annular casing positioned radially outward of the blades and in surrounding relationship therewith, the annular casing including a plurality of ribs on the outer radial surface thereof, wherein the ribs limit the propagation of cracks and holes formed in the annular casing.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
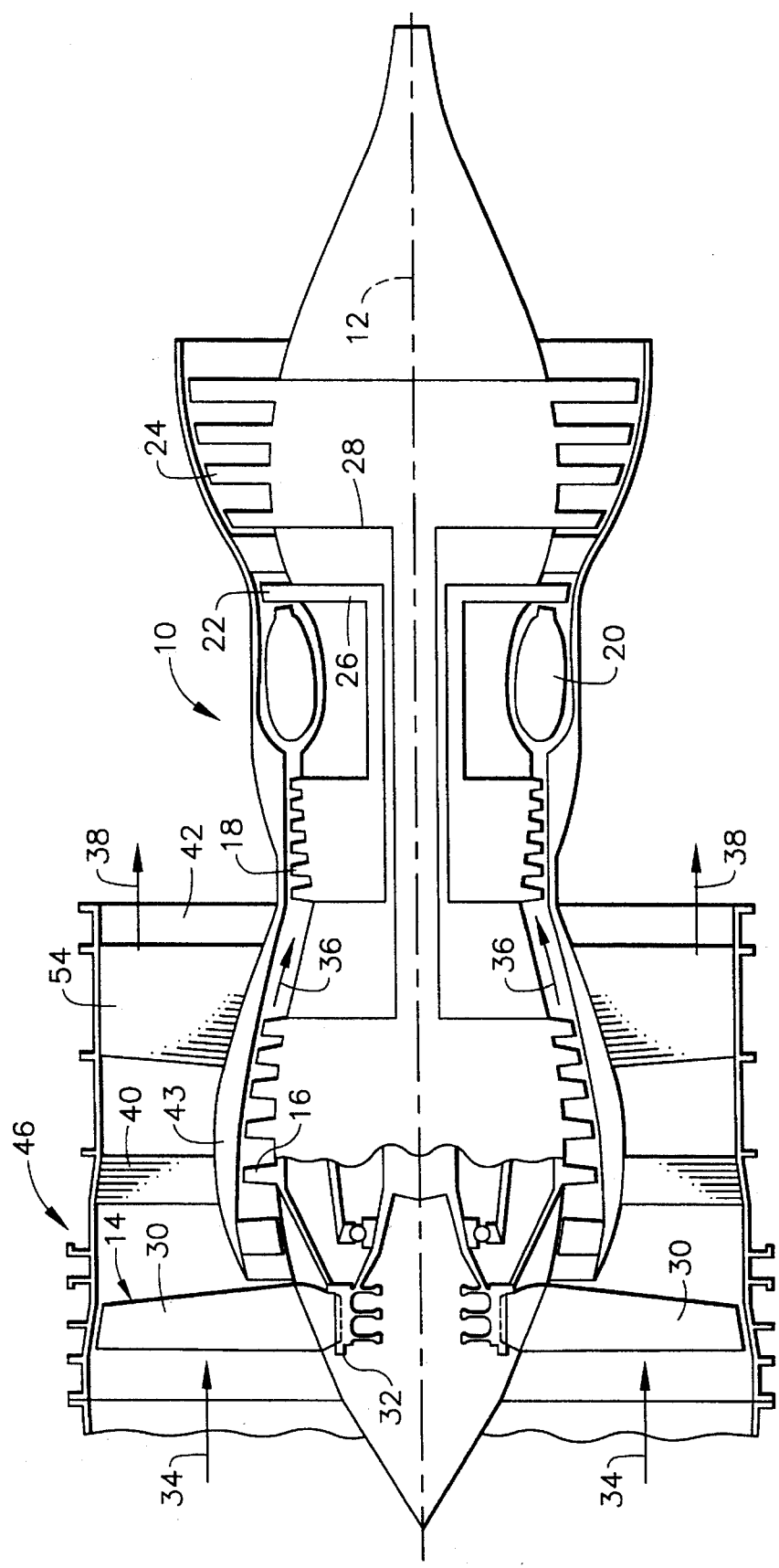
FIG. 1 is a longitudinal cross-sectional view illustrating an exemplary high bypass ratio turbofan engine incorporating the blade containment system of the present invention.

Referring now to the drawings in detail, wherein identical numerals indicate the same elements throughout the figures, FIG. 1 illustrates a longitudinal cross-sectional view of an exemplary high bypass ratio turbofan engine 10. The engine 10 includes, in serial axial flow communication about a longitudinal centerline axis 12, conventional structures including a fan rotor 14, booster 16, high pressure compressor 18, combustor 20, high pressure turbine 22, and low pressure turbine 24. High pressure turbine 22 is drivingly connected to high pressure compressor 18 with a first rotor shaft 26 and low pressure turbine 24 is drivingly connected to both the booster 16 and fan rotor 14 with a second rotor shaft 28. Fan rotor 14 comprises a plurality of radially extending blades 30 mounted on an annular disk 32, wherein disk 32 and blades 30 are rotatable about the longitudinal centerline axis 12 of engine 10.

During operation of engine 10, ambient air 34 enters the engine inlet and a first portion, denoted the primary gas stream 36, passes through fan rotor 14, booster 16 and high pressure compressor 18, being pressurized by each component in succession. Primary gas stream 36 then enters combustor 20 where the pressurized air is mixed with fuel to provide a high energy gas stream. The high energy gas stream then enters in succession high pressure turbine 22 where it is expanded, with energy extracted to drive high pressure compressor 18, and low pressure turbine 24 where it is further expanded, with energy being extracted to drive fan rotor 14 and booster 16. A second portion of ambient air 34, denoted the secondary or bypass airflow 38, passes through fan rotor 14 and fan outlet guide vanes 40 before exiting the engine through annular duct 42, wherein secondary airflow 38 provides a significant portion of the engine thrust.

Figure 2:
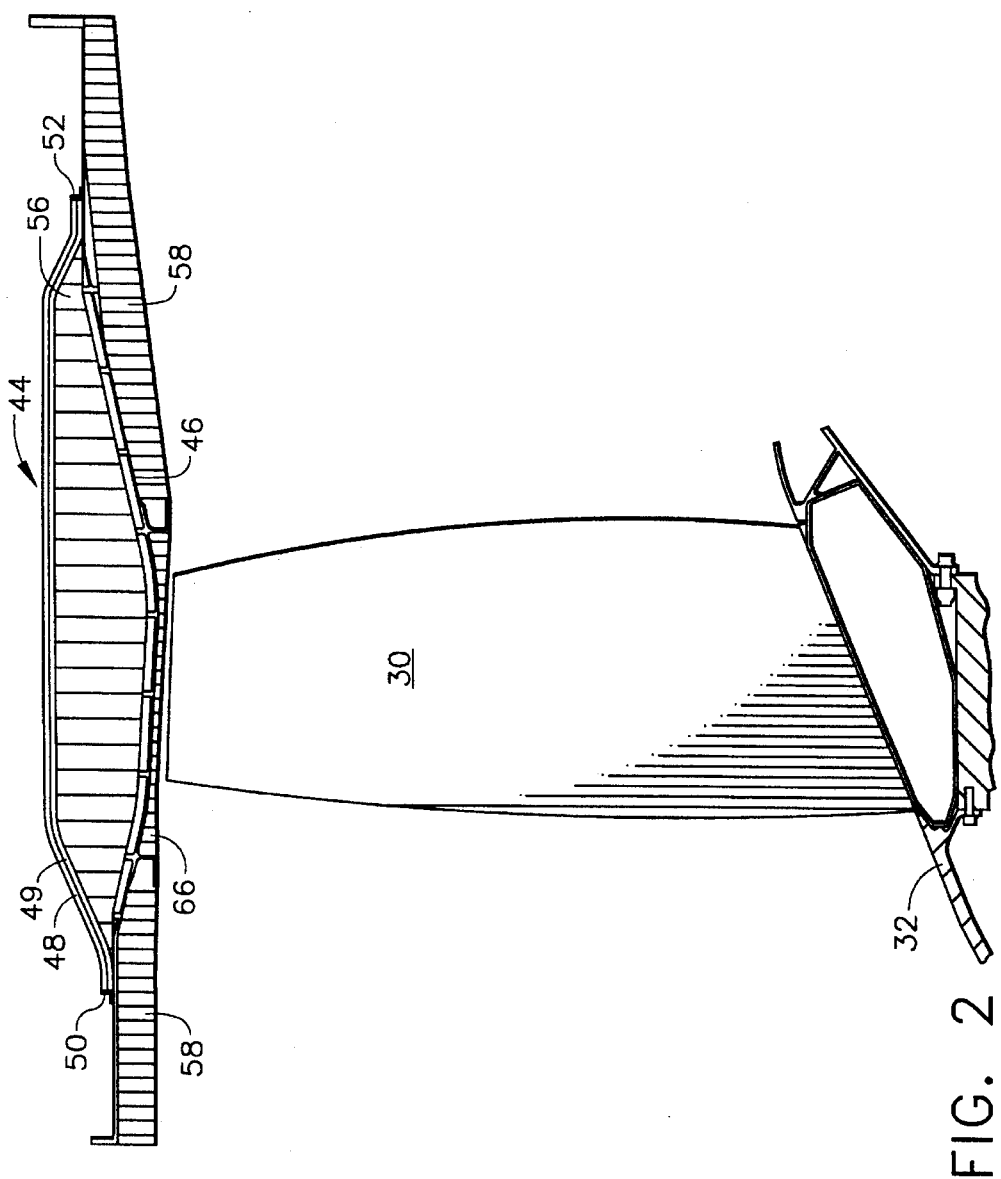
FIG. 2 is an enlarged fragmentary longitudinal cross-sectional view illustrating the blade containment system of the present invention in relation to a fan blade.

FIG. 2 is an enlarged fragmentary longitudinal cross-sectional view of the engine of FIG. 1 illustrating the blade containment system, generally depicted at 44, of the present invention. The blade containment system 44 comprises an inner annular casing 46 which is positioned radially outward of blades 30 and in surrounding relationship therewith (one of which is shown in FIG. 2). An outer shell 48 is spaced radially outward of casing 46 and is attached to annular casing 46 at upstream and downstream axial ends 50 and 52 to define a chamber 55 therebetween (see FIG. 3). Chamber 55, which is also known as a nesting area, preferably includes a honeycomb structure 56 (shown in FIG. 2) which is used to retain broken blades or blade fragments therein. A ballistic material 49, such as KEVLAR®, preferably is wrapped around honeycomb structure 56.

Further, acoustic panels 58 (shown in FIGS. 2 and 3) are affixed to an inner surface 60 of annular casing 46 and disposed axially between blades 30 and outlet guide vanes 40, where it forms a portion of an outer boundary for the flow of bypass airflow 38 through annular duct 42. The inner boundary of duct 42 is formed by core cowling 43. Fan outlet guide vanes 40 extend across annular duct 42, being connected at an outer end to inner casing 46 and at an inner end to the core cowling 43, for the purpose of removing swirl from airflow 38 in a conventional manner. A plurality of structural support struts 54 (shown in FIG. 1) extend radially across annular duct 42 and are attached at an outer end to casing 46 and at an inner end to the core cowling 43, thereby providing a structural link between the cowling 43 and inner annular casing 46.

Figure 3:
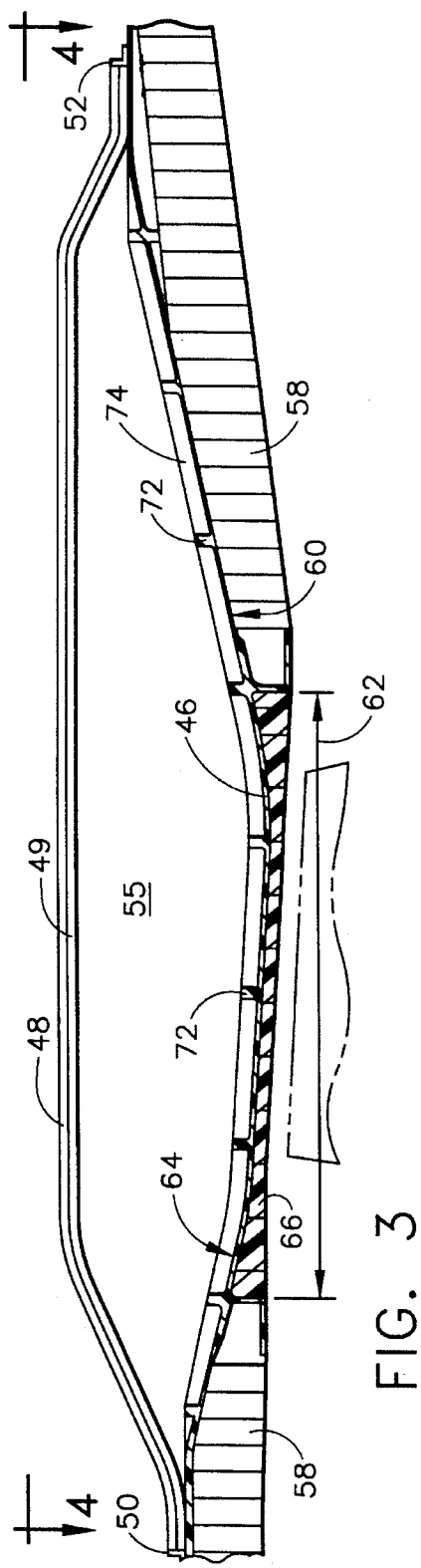
FIG. 3 is a further enlarged longitudinal cross-sectional view illustrating the blade containment system of the present invention.

As seen in FIG. 3, annular casing 46 includes a section 62 which is axially aligned with fan blade 30. Section 62, known as a skating surface, preferably does not include acoustic panels on the radially inward surface 60 thereof, but instead has placed thereon an abradable material 66 in order to provide the best possible fit between blade 30 and casing 46.

In order to limit the propagation of cracks and holes formed therein, annular casing 46 includes a plurality of ribs formed on the outer surface 64 thereof. Such ribs include ribs 72 which are circumferentially oriented with respect to the longitudinal axis 12 in order to limit axial propagation of such cracks and holes, while ribs 74 are provided which are axially oriented with respect to longitudinal axis 12 to limit circumferential propagation of cracks and holes. Preferably, ribs 72 and 74 are formed integrally on the outer surface 64 of annular casing 46.

Figure 6:
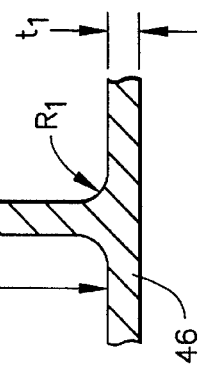
FIG. 6 is a partial cross-sectional view of a rib on the outer surface of the inner annular casing shown in FIGS. 2–5.

It will be seen from FIG. 6 that annular casing 46 has a thickness $t_1$, and ribs 72 have a thickness $t_2$ and a height h. Ribs 74 also have a thickness and height which are equivalent to $t_2$ and h, respectively. Preferably, the thickness of ribs 72 and 74 is approximately equal to thickness $t_1$ of annular casing 46. Height h of ribs 72 and 74 preferably is within the range of 8–10 times the thickness $t_1$ of annular casing 46. It will be further understood that a fillet radius $R_1$ defines the junction of ribs 72 and 74 to outer surface 66 of annular casing 46, which preferably is approximately equal to thickness $t_1$ of annular casing 46.

Figure 4:
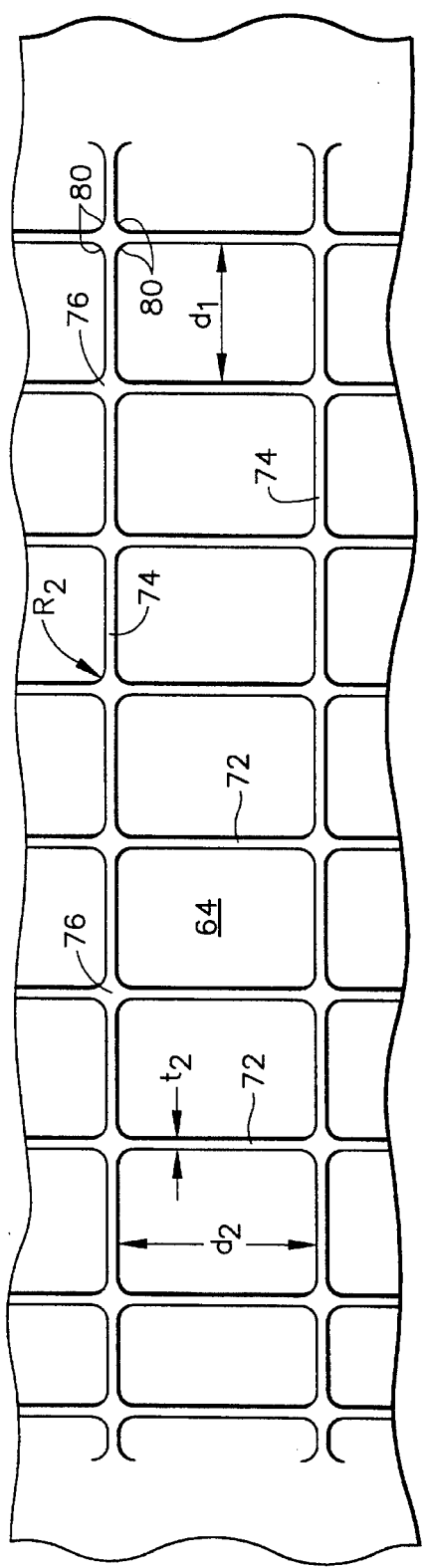
FIG. 4 is a top view of the inner fan casing of the blade containment system taken along line 4—4 in FIG. 3, where the outer shell and honeycomb structure have been removed for clarity.

As best seen in FIG. 4, circumferential ribs 72 intersect axial ribs 74 to form a plurality of junctions 76. Preferably, each corner 80 of junctions 76 has a fillet radius $R_2$ which is approximately equal to thickness $t_1$ of annular casing 46. Although circumferential ribs 72 and axial ribs 74 can be arranged to have varying distances therebetween— $d_1$ defines the distance between circumferential ribs 72 and $d_2$ defines the distance between axial ribs 74— these ribs are preferably arranged to form squares having sides of approximately 4 inches. It is important to note that the thickness $t_2$ and height h of ribs 72 and 74, as well as their arrangement with respect to each other, are meant only to limit the propagation of cracks and holes formed in annular casing 46. Therefore, thickness $t_1$ and height h of ribs 72 and 74 cannot be so great as to prevent the normal penetration of annular casing 46 during a blade-out event. Otherwise, this would defeat the purpose and function of the nesting area 55.

It will be understood that ribs 72, which are circumferential to longitudinal axis 12, are preferably placed on the outer surface 64 of annular casing 46 within axial section 62. However, ribs 72 may be placed on the inner surface 60 of annular casing 46 outside of such axial section 62, wherein they come in contact with acoustic panels 58. In order to ensure that blades or blade fragments properly penetrate annular casing 46 as desired, either circumferential ribs 72 or axial ribs 74 may be spread further apart within axial section 62.

Figure 5:
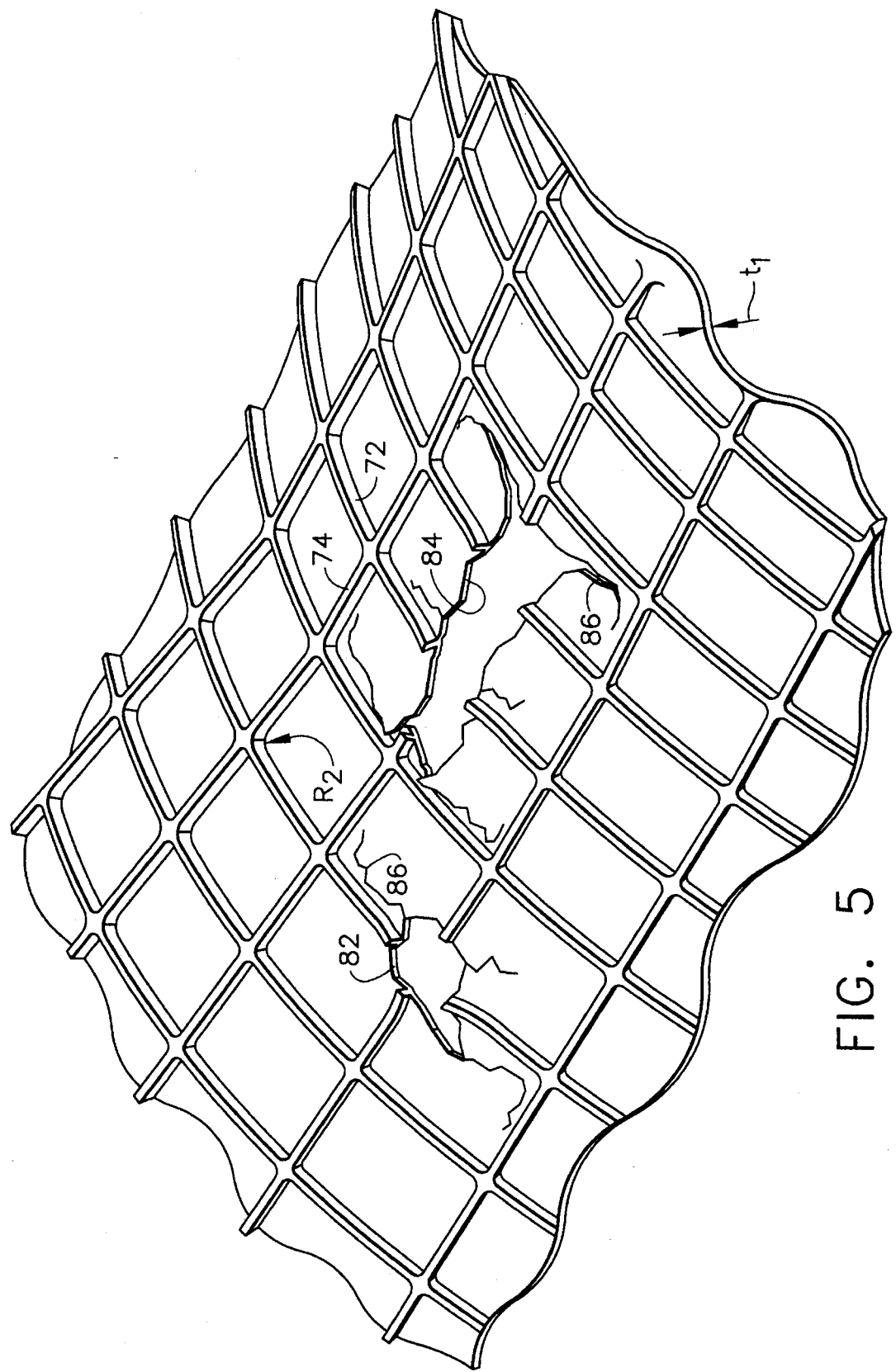
FIG. 5 is a fragmentary perspective view of the outer surface of the inner casing depicted in FIG. 4, where holes and cracks have been formed therein.

As best seen in FIG. 5, wherein holes 82 and 84 have been made in annular casing 46 by means of a blade or blade fragment, it can be seen that ribs 72 and 74 limit the propagation of cracks 86 in the axial and circumferential directions, respectively, by turning them as the cracks approach such ribs. This not only confines the propagation of such cracks within a defined area, but also limits cracks 100 from connecting holes 82 and 84 to form a much larger hole.

Having shown and described the preferred embodiment of the present invention, further adaptations of the blade containment system can be accomplished by appropriate modifications by one of ordinary skill in the art without departing from the scope of the invention.

What is claimed is:

1. In a gas turbine engine having a plurality of radially extending blades mounted on an annular disk, the blades and disk being rotatable about a longitudinal axis of the engine, a blade containment system comprising an annular casing positioned radially outward of the blades and in surrounding relationship therewith, said annular casing including a plurality of ribs on a radially outer surface thereof, wherein at least one of said ribs is axially oriented with respect to said longitudinal axis and said ribs limit the propagation of cracks and holes formed in said annular casing.

2. The blade containment system of claim 1, wherein said ribs are formed integrally on said annular casing outer surface.

3. The blade containment system of claim 2, wherein said annular casing has a thickness and all joints between said integral ribs and said annular casing outer surface have a fillet radius approximately equal to said annular casing thickness.

4. The blade containment system of claim 1, said annular casing including a section axially aligned with said blades having an axial length approximating a chord size of said blades, wherein said circumferential ribs are located on a radially outer surface of said annular casing within said axial section and on a radially inner surface of said annular casing outside said axial section.

5. The blade containment system of claim 1, wherein at least one of said ribs is oriented circumferentially with respect to said longitudinal axis.

6. The blade containment system of claim 5, wherein said annular casing has a thickness and all junctions formed between said axial and circumferential ribs have a fillet radius approximately equal to said annular casing thickness.

7. The blade containment system of claim 6, wherein the distance between each adjacent junction is approximately four inches.

8. The blade containment system of claim 1, wherein said annular casing has a thickness and each of said ribs has a height in the range of 8–10 times said annular casing thickness.

9. The blade containment system of claim 1, further including an outer shell which is spaced radially outward of said annular casing and is attached to said annular casing at first and second axial ends to define a chamber therebetween.

10. The blade containment system of claim 9, wherein a honeycomb structure is included within said chamber.

11. The blade containment system of claim 10, further including a ballistic material between said outer shell and said honeycomb structure.

12. The blade containment system of claim 1, said annular casing including a section axially aligned with said blades having an axial length approximating a chord size of said blades.

13. The blade containment system of claim 12, further including acoustic panels radially inward of said annular casing and axially outside said annular casing section.

14. The blade containment system of claim 12, further including an abradable material attached to a radially inner surface of said annular casing within said axial section.

15. The blade containment system of claim 1, said ribs having a thickness approximately equal to a thickness of said annular casing.

16. A blade containment system for a fan of a gas turbine engine, said fan including blades and a disk rotatable about a longitudinal axis of the engine, comprising:

an annular fan casing positioned radially outward of the fan blades and in surrounding relationship therewith, said annular casing including a plurality of integral ribs formed on a radially outer surface thereof, a plurality of said integral ribs being oriented axially and a plurality of said integral ribs being oriented circumferentially with respect to said longitudinal axis, wherein said ribs limit circumferential and axial propagation of cracks and holes formed in said annular casing.

* * * * *